(12) United States Patent
Jääskeläinen et al.

(10) Patent No.: US 7,628,887 B2
(45) Date of Patent: Dec. 8, 2009

(54) SECURITY PAPER OR BOARD PRODUCT AND SECURITY PACKAGE

(75) Inventors: Timo Jääskeläinen, Joensuu (FI); Raimo Korhonen, Tampere (FI)

(73) Assignee: Avantone Oy, Tampere (FI)

( * ) Notice: Subject to any disclaimer, the term of this patent is extended or adjusted under 35 U.S.C. 154(b) by 0 days.

(21) Appl. No.: 10/297,751

(22) PCT Filed: Jun. 7, 2001

(86) PCT No.: PCT/FI01/00540

§ 371 (c)(1),
(2), (4) Date: May 16, 2003

(87) PCT Pub. No.: WO01/94698

PCT Pub. Date: Dec. 13, 2001

(65) Prior Publication Data

US 2003/0173046 A1    Sep. 18, 2003

(30) Foreign Application Priority Data

Jun. 8, 2000    (FI)    ................................. 20001367

(51) Int. Cl.
*D21H 21/48* (2006.01)
*D21H 21/40* (2006.01)

(52) U.S. Cl. ..................... 162/140; 162/204; 283/85

(58) Field of Classification Search ................ 162/140, 162/162, 134, 117, 103, 109, 125, 204; 101/4, 101/9; 156/209; 283/85
See application file for complete search history.

(56) References Cited

U.S. PATENT DOCUMENTS

| | | | |
|---|---|---|---|
| 4,112,586 A | 9/1978 | Lehtinen | |
| 4,202,626 A * | 5/1980 | Mayer et al. ................... | 356/71 |
| 4,324,613 A | 4/1982 | Wahren | |
| 4,461,095 A | 7/1984 | Lehtinen | |
| 4,496,961 A | 1/1985 | Devrient | |
| 4,662,653 A | 5/1987 | Greenaway | |
| 4,839,201 A | 6/1989 | Rantanen et al. | |
| 4,933,120 A | 6/1990 | D'Amato et al. | |
| 5,155,604 A * | 10/1992 | Miekka et al. .................. | 359/2 |
| 5,335,113 A | 8/1994 | Jackson et al. | |
| 5,354,099 A | 10/1994 | Kaule et al. | |
| 5,437,897 A | 8/1995 | Tanaka et al. | |
| 5,447,335 A | 9/1995 | Haslop | |
| 5,483,363 A * | 1/1996 | Holmes et al. .................. | 359/2 |
| 5,486,933 A | 1/1996 | Shindo et al. | |
| 5,567,276 A | 10/1996 | Boehm et al. | |
| 5,624,076 A * | 4/1997 | Miekka et al. .................. | 241/3 |
| 5,693,135 A * | 12/1997 | Schmid et al. .............. | 106/417 |
| 5,753,349 A * | 5/1998 | Boswell ................... | 428/195.1 |
| 5,756,183 A | 5/1998 | Kutsch et al. | |
| 5,760,961 A * | 6/1998 | Tompkin et al. ............. | 359/576 |
| 5,817,205 A * | 10/1998 | Kaule ......................... | 156/233 |
| 5,861,113 A | 1/1999 | Choquette et al. | |
| 5,862,750 A * | 1/1999 | Dell'Olmo .................... | 101/32 |
| 5,867,919 A | 2/1999 | Retulainen | |
| 5,868,902 A * | 2/1999 | Howland et al. ............. | 162/140 |
| 5,871,615 A * | 2/1999 | Harris ......................... | 162/140 |
| 5,882,770 A | 3/1999 | Makansi | |
| 5,886,798 A * | 3/1999 | Staub et al. ..................... | 359/2 |
| 5,897,746 A * | 4/1999 | Attenberger et al. ......... | 162/140 |
| 5,912,767 A * | 6/1999 | Lee ............................ | 359/567 |
| 5,915,731 A * | 6/1999 | Jackson ........................ | 283/91 |
| 5,928,471 A | 7/1999 | Howland et al. | |
| 5,945,042 A | 8/1999 | Mimura et al. | |
| 5,961,152 A | 10/1999 | Washburn et al. | |
| 5,974,150 A | 10/1999 | Kaish et al. | |
| 5,981,040 A | 11/1999 | Rich et al. | |
| 5,989,389 A | 11/1999 | Sungberg | |
| 6,099,909 A | 8/2000 | Rantanen et al. | |
| 6,120,710 A | 9/2000 | Makansi | |
| 6,168,100 B1 * | 1/2001 | Kato et al. ...................... | 241/1 |
| 6,174,586 B1 | 1/2001 | Peterson | |
| 6,270,625 B1 * | 8/2001 | Krukonis et al. ............. | 162/162 |

(Continued)

FOREIGN PATENT DOCUMENTS

EP    0 486 065    5/1992

(Continued)

OTHER PUBLICATIONS

Office Action issued in EP 01 940 607 on Mar. 26, 2008.

(Continued)

*Primary Examiner*—Eric Hug
*Assistant Examiner*—Dennis Cordray
(74) *Attorney, Agent, or Firm*—Stiennon & Stiennon

(57) ABSTRACT

A security paper or board product carrying micro or nano structures such as diffractive optical elements is formed in which the diffractive structures are integrated into the security paper or board product in the manufacturing process. A security package carrying diffractive structures is manufactured wherein diffractive structures are integrated into the security package at a manufacturing stage of the security package material. A security package contains authentication information in the form of diffractive structures. The diffractive structures are included in the security package in at least in one of the following forms: as embossed in the package material, as part of the size or paste or resin used in the manufacturing process of the security package, or as part of the ink used in printing the security package or the security package material.

6 Claims, 5 Drawing Sheets

U.S. PATENT DOCUMENTS

| | | | |
|---|---|---|---|
| 6,277,496 | B1 | 8/2001 | Lohwasser et al. |
| 6,456,729 | B1 * | 9/2002 | Moore .................. 382/103 |
| 6,468,380 | B1 * | 10/2002 | Christuk et al. ........ 156/244.16 |
| 6,694,873 | B1 | 2/2004 | LaBelle et al. |
| 6,822,769 | B1 * | 11/2004 | Drinkwater et al. ............ 359/2 |
| 6,833,956 | B2 | 12/2004 | Lee |
| 6,855,371 | B2 * | 2/2005 | Gier et al. .................. 427/277 |

FOREIGN PATENT DOCUMENTS

| | | |
|---|---|---|
| EP | 0 580 363 | 1/1994 |
| EP | 0 879 899 | 11/1998 |
| EP | 1 152 369 A1 | 7/2001 |
| FI | 54514 | 8/1978 |
| FI | 61537 | 1/1982 |
| FI | 81734 | 8/1990 |
| FI | 102879 | 8/1992 |
| FI | 102952 | 5/1993 |
| FI | 93885 | 11/1993 |
| FI | 933289 | 1/1994 |
| FI | 101237 | 5/1998 |
| GB | 2 307 487 | 5/1997 |
| JP | 1-61061 U | 4/1989 |
| JP | 3-281395 A | 12/1991 |
| JP | 5-339900 A | 12/1993 |
| JP | 6-282216 A | 10/1994 |
| JP | 7-189198 A | 7/1995 |
| JP | 7-261646 A | 10/1995 |
| JP | 8-179679 A | 7/1996 |
| JP | 10-140500 A | 5/1998 |
| JP | 10-511321 A | 11/1998 |
| JP | 11-21793 A | 1/1999 |
| SE | 500 384 | 11/1992 |
| SE | 505 397 | 11/1995 |
| WO | WO 94/16144 | 7/1994 |
| WO | 96/19357 A1 | 6/1996 |
| WO | WO 98/51861 | 11/1998 |
| WO | 99/17486 A1 | 4/1999 |
| WO | 01/53113 A1 | 7/2001 |
| WO | WO 01/94698 | 12/2001 |

OTHER PUBLICATIONS

"Optics and Precision Engineering" p. 7, No. 2, vol. 5, Apr. 1997 (with translation).
Japanese patent laid-open publication No. 281395/1991.
Japanese patent laid-open publication No. 140500/1998.
Japanese patent laid-open publication No. 21793/1999.
Japanese patent laid-open publication No. 179679/1996.
Japanese patent laid-open publication No. 261646/1995.
Japanese patent laid-open publication No. 61061/1989.
Japanese patent laid-open publication No. 189198/1995.
Search Report issued in Finnish Priority Application No. 20001367, date: 2000.
International Search Report issued in International Patent Application No. PCT/FI01/00540, date: 2001.
International Preliminary Examination Report issued in International Patent Application No. PCT/FI01/00540, date: 2002.
Notification of Reason for Refusal in Japanese App. No. 502232/2002, date: 2006.
First Examination Report from the Indian Patent Office in IN/PCT/2002/01436, date: 2006.
English partial translation of JP 1-61061.

* cited by examiner

SECURITY PAPER OR BOARD PRODUCT AND SECURITY PACKAGE

CROSS REFERENCES TO RELATED APPLICATIONS

This application is a U.S. national stage application of International Application No. PCT/FI01/00540, filed Jun. 7, 2001, and claims priority on Finnish Application No. 20001367 filed Jun. 8, 2000, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The present invention relates to a method for producing a security paper or board product or a security package carrying micro or nano structures such as diffractive optical elements for providing information for authentication. The present invention also relates to a security package containing authentication information in a form of diffractive structures.

Diffractive optical elements are optical components, which contain structures with dimensions of the order of wavelength of light. With diffractive optical elements it is possible to control propagation of light by macroscopically smooth surfaces containing micro or nano structures. These structures are later referred to as diffractive structures. A simple example of a diffractive optical component is a one-dimensional diffraction grating consisting of periodic grooves of the order of wavelength. When a white light beam is passed through or reflected from a diffraction grating it is dispersed in a spectrum. "Diffractive Optics for Industrial and Commercial Applications" (edited by Turunen and Wyrowski, Akademie Verlag 1997, ISBN 3-05-501733-1) discloses diffractive optics and components and their use and design. This source is later referred to as "Diffractive Optics".

It is known from prior art to use diffractive structures as well as other optical security elements as watermarks in valuable documents and products for authentication purpose. Diffractive optical security elements are typically embossed on thin foils and applied on articles to be marked as separate adhesives. Optical security objects can include various elements observable by various methods. According to "Diffractive Optics" these observation methods can be divided into first-line, second-line, and third-line inspection levels. First-line inspection is based on the human senses only, for instance vision, hearing and the tactile senses. Members of the general public, who must be able to distinguish counterfeits and forgeries, mainly use first-line inspection that can be performed by the naked eye. In second-line inspection, simple tools are used to reveal hidden security objects. Examples of these tools are magnifiers, barcode scanners, laser pointers, ultraviolet sources and automatic teller machines. Third-line inspection involves forensic investigation of the security element performed by experts using advanced techniques and equipment. This kind of equipment is very expensive and is available only in a few research institutes in the world.

Manufacturing of diffractive structures requires advanced and complex systems, which only are available in advanced laboratories. Therefore diffractive structures are very difficult to forge.

According to "Diffractive Optics", advantages for using diffractive structures as security elements are firstly, that they can not be reproduced with colour copiers or modern desktop publishing equipment. Secondly, production of diffractive structures is quite involved and it requires special equipment and knowledge. Thirdly, the optically variable effects are generally quite noticeable and therefore they adequately facilitate first line inspection.

Diffractive structures are usually manufactured by microlithographic methods. U.S. Pat. No. 4,662,653 discloses an optically diffracting security element comprising a continuous reflecting surface, a dielectric layer formed contiguous with the reflecting surface, and a plurality of non-continuous reflecting surface portions embedded in the dielectric layer in a predetermined arrangement for storing authentication information and a process for forming such element.

U.S. Pat. No. 5,862,750 discloses a method for impression microengravings, which reproduce holograms, kinetic holograms or diffraction patterns, directly on paper through an embossing process. In this method paper is subjected to a pre-treatment step prior to embossing said microengravings to paper. The required pre-treatment is a humidification step, which gives to a paper a degree of humidity between 60% and 80% of relative humidity. The humidified paper is then passed through an embossing group at a certain temperature and pressure. According to said publication it is not possible to impress microengravings directly on untreated paper.

U.S. Pat. No. 5,871,615 discloses security paper carrying a surface profile pattern imparted to the paper during its manufacture which requires de-watering of the paper when imparting the profile pattern and drying thereafter. The tactile surface profile pattern is visible when viewed under low angle light, which facilitates verification or authentication of security documents made using the patterned paper.

U.S. Pat. No. 5,981,040 discloses a holographic image produced of resinous ink comprising metallic particles. This special ink is used for printing to a sensitive document to form a reflective coating, which is embossed by a shim. The embossed area of the reflective coating reflects light in a slightly different direction than the remainder of the reflective coating, thereby creating a holographic image.

U.S. Pat. No. 5,974,150 discloses an authentication system comprising a medium having a plurality of elements, which are distinctive, detectable and disposed in an irregular pattern or having an intrinsic irregularity. The system provides authentication of an object by providing at least two levels of security, which are a physical level, provided by an observable feature an authentication certificate, and an information level, provided by encoding a unique characteristic of the authentication certificate (such as the observable feature) and/or object to be authenticated in a marking on the certificate.

U.S. Pat. No. 5,961,152 discloses security paper which has a filament bonded and embedded into paper which has been previously manufactured. The filament is bonded to the paper by an adhesive, or by heat and pressure. The filament may include a combination of security features, such as reflective filaments, fluorescent filaments, and high tensile strength filaments.

The problems with the prior art security objects are that they are expensive to manufacture, difficult or expensive to integrate on paper and easy to counterfeit if they are applicable as separate adhesive labels. The same applies to laminated package materials containing diffractive foil layers.

SUMMARY OF THE INVENTION

The object of the present invention is to provide a security package material and package that is inexpensive and fast to manufacture in quantity.

A further object of the present invention is to provide a method for embossing security elements directly into security package material.

A further object of the present invention is to provide a method for manufacturing security package material using existing machinery equipped with means for integrating diffractive structures into package material.

A further object of the present invention is to provide a method for printing security markings directly on the packaging material by using ink, dye, or other suitable colored or colorless painting liquids containing diffractive structures.

A further object of the present invention is to provide a manufacturing method for a packaging material containing diffractive structures by using size or paste containing diffractive structures in the manufacturing process of paper or board.

A further object of the present invention is to provide a manufacturing method for a packaging material containing diffractive structures by using furnish containing diffractive structures in the manufacturing process of paper or board.

In view of achieving of the objectives stated above and those that will come out later the method for producing a security paper or board product carrying micro or nano structures is mainly characterised in that the diffractive structures comprise at least a section that is detectable only by inspection tools and the diffractive structures are integrated into the security paper or board product at the manufacturing process of said product.

A method for producing a security package carrying micro or nano structures such as diffractive optical elements is characterised in that the diffractive structures comprise at least a section that is detectable only by inspection tools and the diffractive structures are integrated into the security package at a manufacturing stage of the security package material.

Security package containing authentication information in a form of diffractive structures is characterised in that the diffractive structures comprise at least a section that is detectable only by inspection tools and the diffractive structures are included in the security package at least in one of the following forms: as embossed in the package material, as part of the size or paste or resin used in the manufacturing process of the security package, or as part of the ink used in printing the security package or the security package material.

In prior art it is known to transfer diffractive structures to paper when remoisturing the paper first. According to the tests by the applicant it has been found out that it is possible to emboss a diffractive structure directly on paper without any additional preparing stages which would require expensive stages to the paper making process. This embossing process can be integrated to several different parts of papermaking, finishing, converting, or printing process.

According to the invention diffractive structures used as security elements are included in the package itself by inserting the elements to the package material in the manufacturing stage. No further stages for adding security information is needed. The security elements can be embossed onto the surface of the package material or they can be integrated as small pieces in paste, size, resin, or furnish of the paper or board or package material. Diffractive security elements can also be mixed into the ink, dye, or painting liquids used in printing the package.

The advantage of the present invention is the possibility to manufacture security packages with low cost and with high security level. This way forging the package is very difficult and various types of security marks and security levels are easily available. The security information can be included in any part of the package and it can be in visible form or in hidden form. It is possible to include a very large amount of information in a package when the method of the invention is applied.

Because of the relatively low cost of producing the security packages according to the invention, the present invention can be utilized in the package industry manufacturing packages for consumer products liable to forgery, e.g. music CD's, computer products, medicines, cigarettes, or generally any brand products.

In a preferred embodiment of the invention a package bearing diffractive structures with all security inspection levels is produced.

BRIEF DESCRIPTION OF THE DRAWINGS

In the following the invention will be described in detail with reference to the figures in the accompanying drawing, the invention being however by no means strictly confined to the details of said embodiments or variations.

DESCRIPTION OF THE PREFERRED EMBODIMENTS

In embossing security elements to the package material in the papermaking process, an embossing surface containing a plurality of diffractive structure shims is needed. A diffractive structure shim is a means for embossing the diffractive structures to the desired material, such as paper or board or a package material web. The diffractive structure shims are preferably arranged in a suitably distributed matrix in the embossing surface, which is e.g. a roll in the paper machine or printing unit as described later. For the shim matrix a desired diffractive structure is first originated with an electron beam, a laser beam, an X-ray beam, an ion beam, or other lithographic method to a suitable substrate coated with a proper resist. Thus a microscopic surface relief profile is formed in the resist layer. Thereafter the said surface is transformed into a negative surface profile in nickel by electroplating. The result is used to generate second and third generation shims for mass production. The process of manufacturing shims is disclosed in detail in "Diffractive Optics". Third generation shims are then used in producing package material integrated with the desired diffractive structures.

The method of embossing diffractive structures in security material is applicable to various kinds of paper, board, or package material grades suitable for printing and packaging. Examples of these are common paper (e.g. newsprint, SC paper, coated mechanical paper, uncoated fine paper, coated fine paper), paperboard (e.g. cartonboards, containerboards, special boards), specialty papers (e.g. cable paper, capacitor tissue, conductive paper, decor paper, photographic paper, building papers, sack kraft, flexible packaging, label paper). See "Paper and Board Grades", part 18 in Papermaking Science and Technology series, ISBN 952-5216-18-7, for detailed information of these grades.

Figure 1:
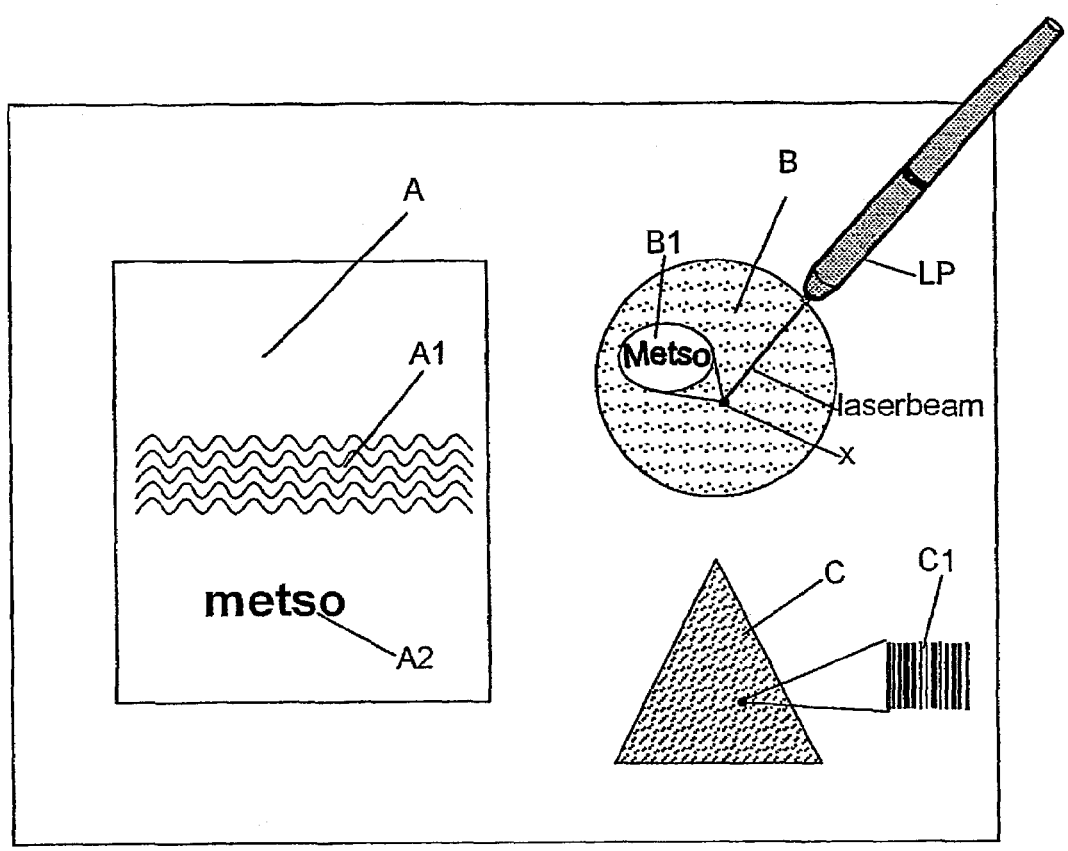
FIG. 1 shows an example of diffractive security structures.

FIG. 1 shows an example of a diffractive security structure divided into different security level elements. In this example the diffractive security structure contains areas for various security inspection levels. In area A there is a figure that can be identified with bare eye i.e. with first line inspection. Area A comprises two security objects A1, A2. Object A1 is a simple wave pattern embossed in the paper and it can be seen by bare eye. Object A2 contains text seen by bare eye at a certain view angle when illuminated suitably. Text in object A2 may also contain micro or nano structure information readable only with a second or third level inspection tools.

In area B there is information that can be read with a second-line inspection tool, such as a laser pointer. Area B comprises micro or nano dimensional security structures embossed in the material. A laser pointer LP is used for directing a laser beam to point x in area B. Laser beam light diffracts from the security structure in point x and reveals a security structure B1.

Area C comprises micro or nano structures, which are only readable by third level inspection, tools i.e. state-of-the-art equipment in research laboratories. An example of a security object C1 revealed by such an inspection tool is shown. Object C1 is a micro scale bar code, which identifies the security, marked object. Alternatively, diffractive structures containing second and third line inspection levels can be hidden in various forms within the area covered by the area of the first line inspection level structures.

In the method according to the invention for producing security paper or board or security packages diffractive structures are embossed to the package paper or cardboard as described above. In another embodiment of the present invention diffractive structures are included in the paper or board product or in the security package material as small pieces containing diffractive structures. In this method diffractive structures are embossed in thin sheets of a suitable material, such as aluminium or plastic foil. By grinding, cutting, crushing, or chopping the embossed sheet to small pieces, chopped material with pieces containing diffractive structures is produced and this material can be mixed to a raw material used in paper making or printing process. The chopped material can be mixed for instance into ink, size, paste, resin, or furnish.

When using furnish mixed with pieces containing diffractive structures, conventional paper and board making machinery can be applied. Using this approach in the paper making process, the produced paper or cardboard gets a glittering appearance, which is typical for diffracting surfaces. Similarly well known sizing and coating methods can be used when mixing pieces containing diffractive structures into size or paste. Also, chopped material containing diffractive structures can be added to ink which is then useable in any conventional printing system.

Suitable dimensions for chopped material with pieces containing diffractive structures is of the order of 1 to 10 µm in ink, size, paste and resin and up to 1 mm in furnish. Information contained in the diffractive elements can be read from security paper or board or package according to the invention using a special reading device. When using ink containing diffractive structures in printing of the security packages, the text or pattern printed with diffractive ink contains information of the diffractive elements and also this information is readable with special reading equipment.

Figure 2:
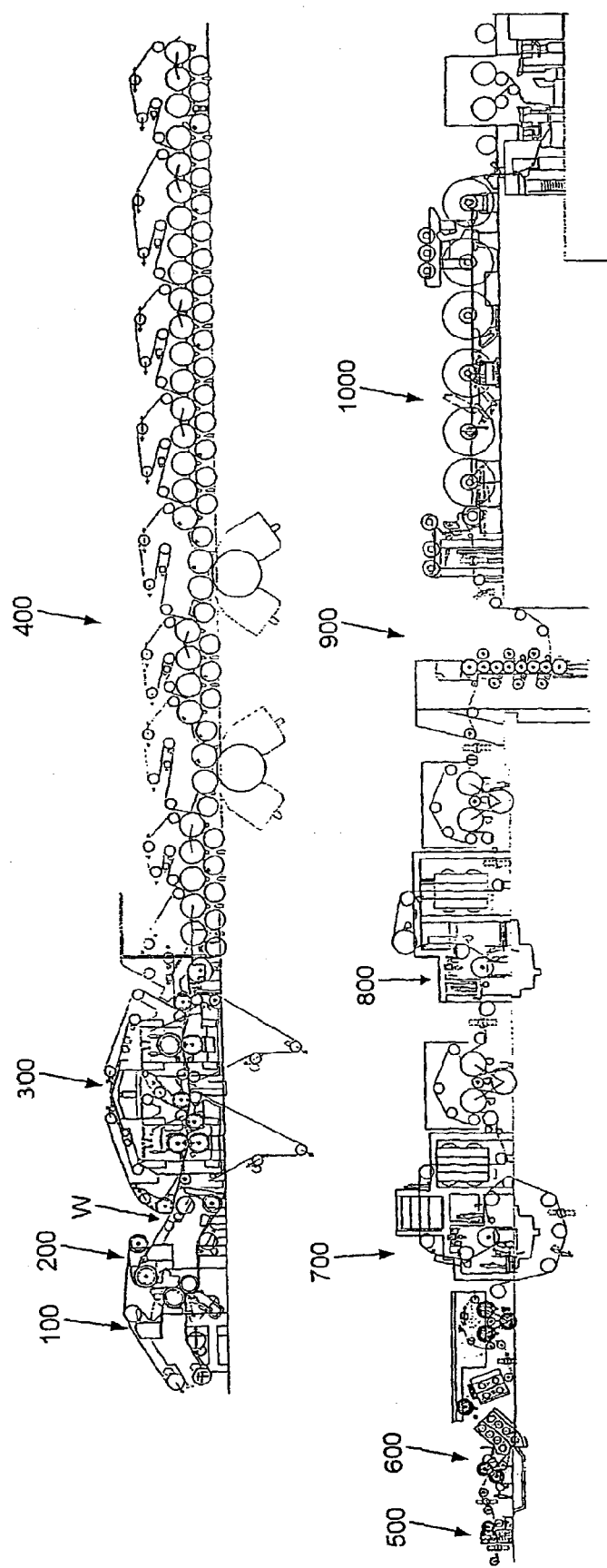
FIG. 2 is a side view of a paper machine.

The method of embossing or printing the diffractive structures directly on paper can be carried out e.g. in the following parts of the papermaking or package manufacturing process:
 on- or off machine calender unit
 drying unit marketed by Metso Paper, Inc. by the name Condebelt®
 impulse drying unit
 flexographic, gravure, offset, or other commercially available printing systems
 extrusion coating lines The method of adding chopped material containing diffractive structures is applicable in the following parts of the papermaking or package manufacturing process:
 stock preparation unit
 sizing unit
 coating unit
 flexographic, gravure, offset, or other commercially available printing systems
 extrusion coating lines
 flexible package material lines FIG. 2 shows a side view of a modern paper or board machine. As shown in FIG. 2, stock is fed from a headbox 100 to a wire section 200 followed by a press section 300. The web W is passed from the press section 300 to a dryer section 400 followed by a soft-calendering unit 500. The film-sizing unit 600 is used for treating the web. Surface-sizing, pigmenting, or coating is performed at this stage typically on both sides of the web at the same time, but the surfaces of the web can also be treated separately in successive units. After that, the paper web is dried by using infrared dryers and airborne web-dryers and a short cylinder group, which follows them.

The web W is coated in coating stations 700, 800 which coat the web W on both sides. After that, the web W is calendered in a multi-nip calender 900, in which the linear load in each nip can be advantageously regulated separately. Finally, the web W is passed to a reel-up 1000 in which the web is wound into reels.

Figure 3:
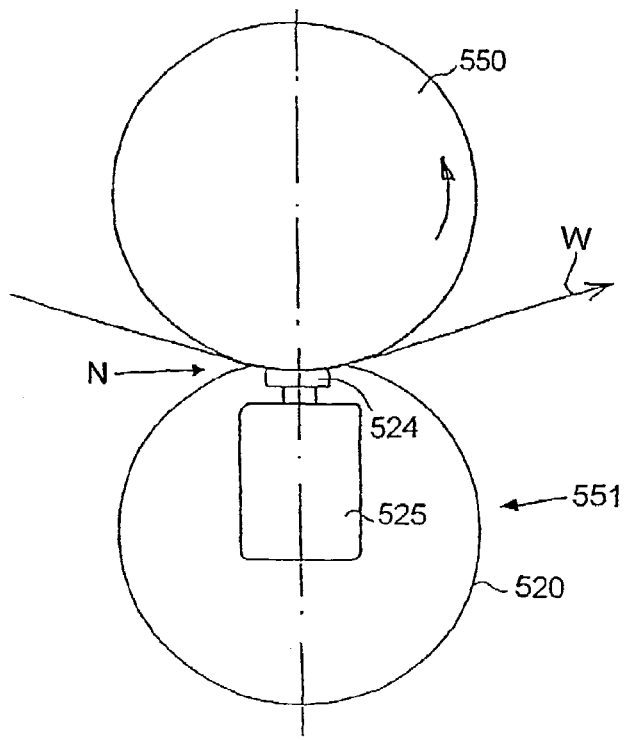
FIG. 3 is a schematic illustration of a calender nip for a paper machine.

FIG. 3 shows an example of applying the method of embossing diffractive structures to paper in a calender. In the calender an extended calendering nip N is formed between an upper roll 550 and a shoe roll 551. The shoe roll 551 comprises a press shoe 524 supported by a stationary beam 525 as well as a calendering belt 520 passed around the press shoe 524 and the beam 525 and formed as an endless loop. By means of the press shoe 524, the necessary load is produced in the nip N. According to the invention the upper roll 550 is coated with the diffractive structure shims and the diffractive structures are transferred to the paper or cardboard web W passing the nip N. In another embodiment the calendering belt 520 is coated with diffractive structure shims. Although a shoe calender has been described above the present invention can as well be applied into the prior art hard roll calenders, soft calenders and supercalenders either on- or off-machine.

Figure 4:
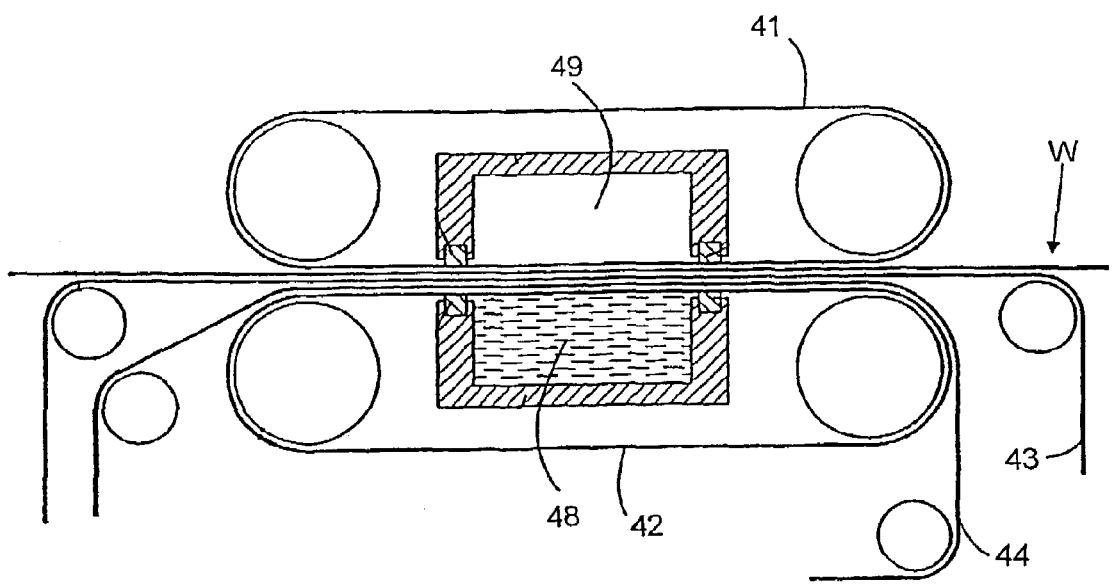
FIG. 4 is a schematic illustration of a Condebelt drying system of a paper machine.

FIG. 4 shows a side view of a Condebelt drying system. The Condebelt drying system is known, e.g., from patent publications FI-54514, FI-61537, and FI-101237. The Condebelt drying system is typically used in cardboard machines. In the Condebelt drying system the web W carried on a fine-structured wire 43 and a coarse wire 44 is fed through a drying unit 48, 49 between two smooth steel belts 41, 42. The upper steel belt 41 contacting the web W is heated while the lower steel belt 42 is cooled. Subject to high pressure and temperature difference the moisture in the web W evaporates and the generated vapor traverses the wires 43, 44 to condense on the cooler steel belt or the lower belt 42. The condensed water is taken out from the drying zone. This way dried web has very advantageous strength characteristics combined with absence of CD shrinkage. A smooth surface is obtained on one side of the web. The method according to the invention of embossing the diffractive structures directly on paper or cardboard is applicable in the Condebelt drying system by providing the heated metal belt wire with the diffractive structure shims.

In an impulse drying process, the web carried on the felt is fed through a pressing nip. The roll contacting the web is heated to temperatures well above 100° C. In this known process, a very smooth web surface can be obtained. According to one embodiment of the invention, the heated roll is provided with the diffractive structure shims to transfer the diffractive marking directly onto the web surface. The impulse drying process is disclosed e.g. in U.S. Pat. No. 4,324,613.

Figure 5:
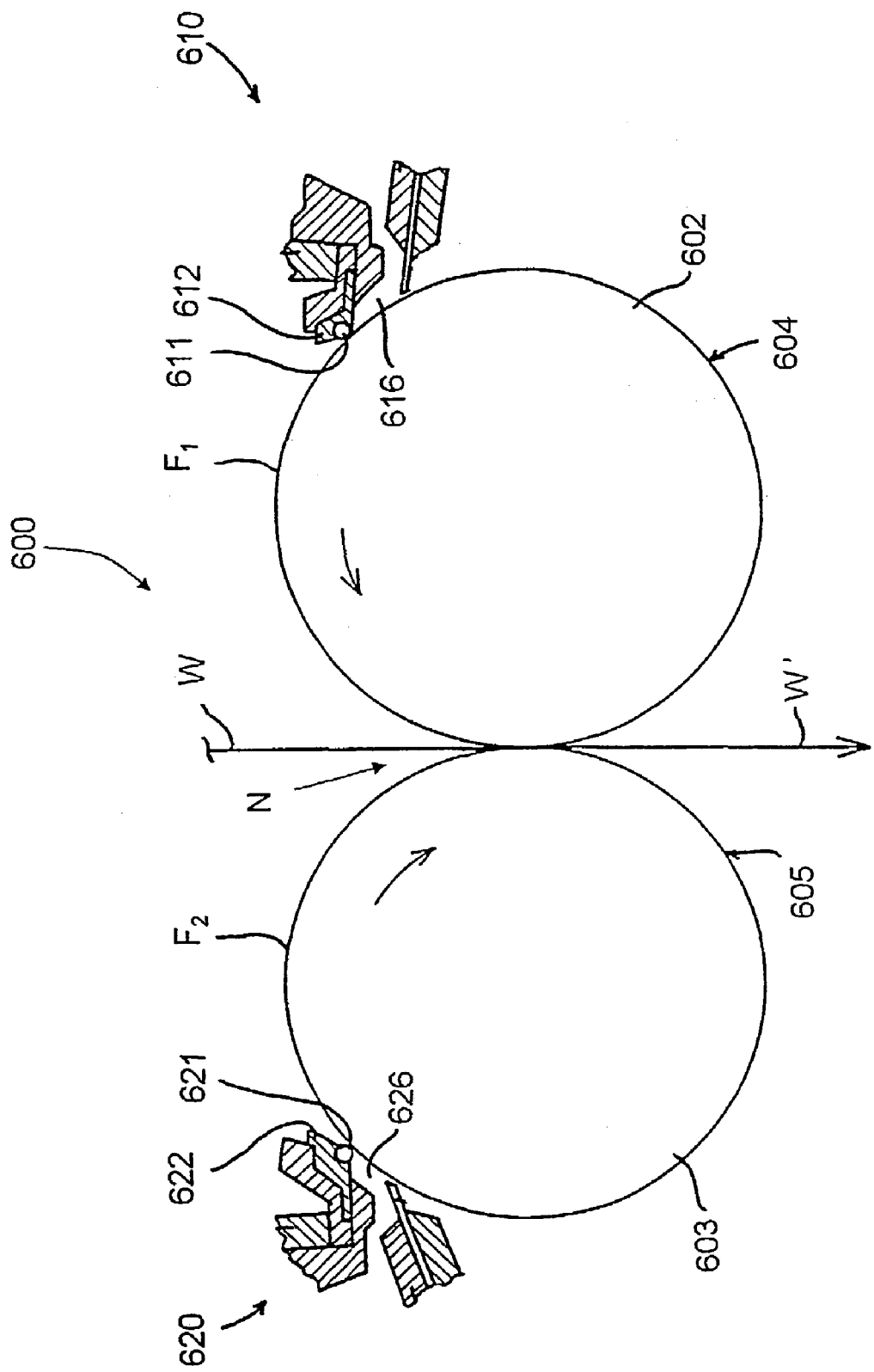
FIG. 5 is a schematic illustration of a surface-sizing/pigmenting unit.

FIG. 5 is a schematic illustration of an example of a surface-sizing/pigmenting unit 600, which is used for sizing and coating paper. Surface-sizing/pigmenting systems are disclosed e.g. in FI-93885 and FI-81734. The surface-sizing/pigmenting unit 600 comprises rolls 602 and 603 of the size press, so that the first roll 602 and the second roll 603 form a nip N with one another, through which nip the paper or board web W is passed. In the surface-sizing/pigmenting unit 600, a first size film $F_1$ is metered onto the face of the first roll by means of a first coating device 610 and, in a corresponding way, a second size film $F_2$ is metered onto the face 605 of the second roll by means of a second coating device 620. In the roll nip N, the size films $F_1$ and $F_2$ are transferred to the paper or board web W running through the nip. The coated web is denoted with the reference W'. The size films $F_1$ and $F_2$ are spread onto the faces 604 and 605 of the size press rolls 602, 603 using bar coaters, which are equal to one another in this example of a surface-sizing/pigmenting unit 600. In the coating devices 610, 620 the coating agent is introduced into a pressurized coating-agent chamber 616, 626 placed before the coating bar 611, 621. The coating bar 611, 621 is fitted in a cradle 612, 622 supporting the coating bar 611, 621 over its entire length and is rotated in directions opposite to the directions of rotation of the rolls 602, 603. According to the invention chopped material containing diffractive structures is added to size or paste which is then transferred to the web in the surface-sizing/pigmenting unit 600.

Figure 6:
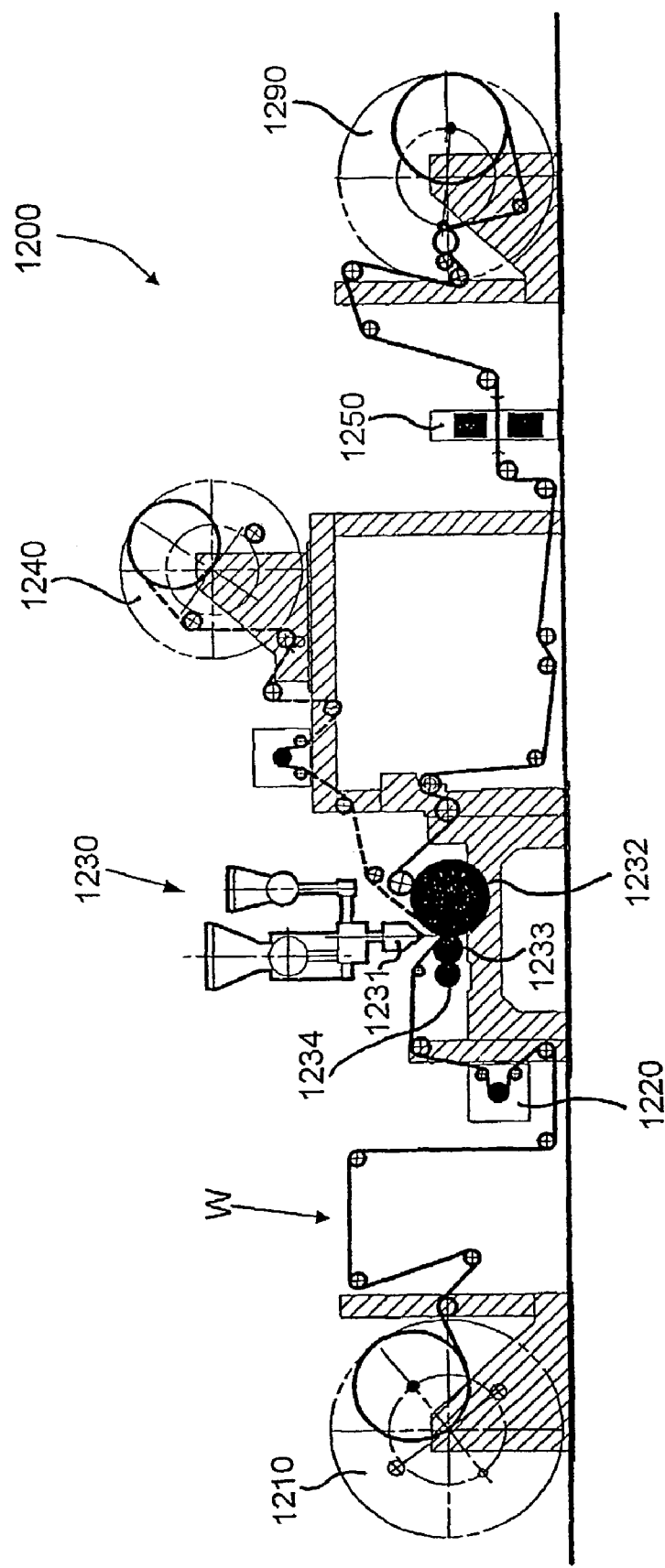
FIG. 6 is a schematic illustration of an extrusion coating line.

Extrusion is a process that transfers thermoplastics from a solid to a melted state and compresses them against a substrate using the pressure in a die. FIG. 6 shows an example of an extrusion coating line 1200. A web (paper, aluminium or film) W is unwound from a main unwinder 1210. The pre-treatment unit 1220 is used for pre-treating the web W in a way depending on the material e.g. in order to increase the adhesion. In the extrusion coating unit 1230 a melted resin (LDPE, PP, or other) is extruded on the web W with the extruder 1231. The resin is melted in the extruder 1231 and through a flat die it is extruded on the web and immediately cooled. The extrusion coating unit 1230 comprises a chill roll 1232 with chromium plated surface, a pressure roller 1233 with a rubber surface, and a back-up roller 1234 with chromium plated surface.

In the nip between the pressure roller 1233 and the chill roll 1232 the extruded resin comes in contact with the web. The purpose of the chill roll 1232 is to reduce the temperature of the resin (normally extruded at temperature ranging from 250° C. to 300° C.) to a value below the melting point in order to prevent the sticking on the chill roll surface 1232.

As an alternative, it is possible to laminate two different webs in the extrusion coating unit 1230 using the resin as adhesive. In this case the second web is coming from the secondary unwinder 1240. It is possible to use more than one extruder if the product structure requires different layers. In this case the resins extruded from the extruders are collected to the die through a feedblock. The purpose of the feedblock is to collect the materials from the extruders maintaining the different layers. The coated or laminated material obtained with this process is rewound on the rewinder 1290. A thickness gauge 1250 is normally placed before the rewinder 1290 to measure thickness variation of the final product to be rewound. An automatic control system can be used to manage the extrusion die in order to control the thickness of the extruded material.

The method according to the invention is applicable in an extrusion line preferably in the nip between the pressure roller 1233 and the chill roll 1232. Either of the pressure roller 1233 or the chill roll 1232 is provided with diffractive structure shims according to the invention. Alternatively, chopped material containing diffractive structures is mixed with the extrusion coating resin.

The method according to the invention is also applicable in the printing process of the security paper, board, or package. The printing process can be carried out in flexographic, gravure, offset, or other commercially available printing systems. A printing machine is optionally provided with an embossing unit, which is preferably placed in the printing line after the last printing unit. According to the present invention said embossing unit is provided with the diffractive structure shims to transfer the diffractive marking directly onto the web surface in the printing line. In another embodiment of the present invention chopped material containing diffractive structures is added to ink and then transferred to the printed material.

Alternatively, the method of embossing diffractive structures directly on paper or board or package material according to the invention is applicable to sheet material also. Sheets of paper, board, or package material can be embossed by stamping with a stamping device. A stamping device can be installed e.g. in connection with a sheet cutter in paper/board machine, printing machine, or such.

Laser pointers are preferable tools for inspecting the authenticity of the security paper or board products or security packages according to the invention. Laser pointers are relatively inexpensive and easy to carry along so they are available to the public. When pointing a security marking according to the invention with a laser beam, special effects not seen with the naked eye are revealed. These can be, e.g., a company or brand logo appearing at or coming out from the security marking.

The method according to the invention can be fully integrated to the existing paper and cardboard machines and coating and printing lines. No auxiliary systems need to be built.

In addition to using the method according to the invention for producing security marked material for authentication purposes, the same method is applicable for decorative use.

In the following, the patent claims will be given and various details of the invention may show variation within the scope of the inventive idea defined in the patent claims and differ from the details disclosed above for the sake of example only.

The invention claimed is:

1. A method for producing a security paper or board product, said security product comprising a paper or board security material furthermore comprising optical diffractive structures carried by said security material and containing microstructures or nanostructures comprising at least a section that is detectable only by second or third line inspection tools, wherein the method comprises a step of integrating said diffractive structures into said security material in a printing process of said security material and using a forming surface containing a diffractive shim structure, the method being characterized in that, in the step of integrating said diffractive structures into said security material a security material web is passed through a nip formed between said forming surface and a backing surface, thereby embossing said diffractive structures into said security material web without remoisturing the security material web.

2. The method of claim 1 wherein the security material comprises paper or board or flexible packaging material having one or more layers of paper, plastic and/or metal.

3. The method of claim 1 wherein said diffractive structures are embossed into said security material in a printing unit.

4. The method of claim 1 wherein the security material is paper, board, cardboard, corrugated board, printed paper, or printed cardboard.

5. The method of claim 1 wherein the security material is extrusion coated or laminated material.

6. The method of claim 1 wherein the diffractive structures comprise a first section only detectable by said second or third line inspection tools and at least a second section detectable at a different inspection level than said first section.

* * * * *